US008509172B2

(12) United States Patent
Liang et al.

(10) Patent No.: US 8,509,172 B2
(45) Date of Patent: Aug. 13, 2013

(54) METHOD FOR TRANSMITTING AN UPLINK CHANNEL SOUNDING REFERENCE SIGNAL

(75) Inventors: Chunli Liang, Shenzhen (CN); Peng Hao, Shenzhen (CN); Shuqiang Xia, Shenzhen (CN); Bo Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 265 days.

(21) Appl. No.: 12/999,199

(22) PCT Filed: Jul. 10, 2009

(86) PCT No.: PCT/CN2009/072720
§ 371 (c)(1),
(2), (4) Date: Dec. 15, 2010

(87) PCT Pub. No.: WO2010/012191
PCT Pub. Date: Feb. 4, 2010

(65) Prior Publication Data
US 2011/0090862 A1    Apr. 21, 2011

(30) Foreign Application Priority Data

Jul. 29, 2008  (CN) .......................... 2008 1 0144407

(51) Int. Cl.
*H04W 72/00*   (2009.01)
*H04B 1/713*   (2011.01)

(52) U.S. Cl.
USPC ........... 370/329; 370/278; 370/328; 370/330; 370/335; 370/338

(58) Field of Classification Search
USPC .............. 370/254–258, 277, 278, 328, 330, 370/343–345, 408, 441, 468; 455/442, 450, 455/522; 375/133, 362
See application file for complete search history.

(56) References Cited

U.S. PATENT DOCUMENTS 6,587,697 B2 *  7/2003  Terry et al. ................ 455/522
6,615,054 B2 *  9/2003  Terry et al. ................ 455/522
(Continued)

FOREIGN PATENT DOCUMENTS

| CN | 1509579 A | 6/2004 |
|----|-----------|--------|
| CN | 1997200 A | 7/2007 |

(Continued)

OTHER PUBLICATIONS

International Search Report in international application No. PCT/CN2009/072720, mailed on Sep. 24, 2009.

(Continued)

*Primary Examiner* — Otis L Thompson, Jr.
*Assistant Examiner* — Jael Ulysse
(74) *Attorney, Agent, or Firm* — Oppedahl Patent Law Firm LLC (57) ABSTRACT

A method wherein: a base station assigns resource to an uplink channel sounding reference signal (SRS) of a UE, sends the SRS configuration parameters to the UE, wherein the SRS configuration parameters include SRS bandwidth parameter $B_{SRS}$ and an SRS frequency domain position parameter $n_{RRC}$; after receiving the SRS configuration parameters, the UE calculates the frequency domain starting position of the SRS of the resource used for sending the SRS according to the SRS configuration parameters, and sends the SRS to the base station using the resource; wherein the frequency domain resource assigned to the SRS by the base station corresponds to a node of a tree structure configured by an SRS bandwidth, and the configured $B_{SRS}$ corresponds to the level on which the node is located, while the configured $n_{RRC}$ corresponds to the index of a branch node on the lowest level of the node in the tree structure.

12 Claims, 2 Drawing Sheets

(56) References Cited

U.S. PATENT DOCUMENTS

| | | | |
|---|---|---|---|
| 6,745,045 B2* | 6/2004 | Terry et al. | 455/522 |
| 6,842,430 B1* | 1/2005 | Melnik | 370/254 |
| 7,636,328 B2* | 12/2009 | Teague et al. | 370/277 |
| 8,160,008 B2* | 4/2012 | McCoy | 370/329 |
| 8,180,009 B2* | 5/2012 | McCoy | 375/362 |
| 8,218,565 B2* | 7/2012 | Chen et al. | 370/462 |
| 2002/0168994 A1 | 11/2002 | Terry et al. | |
| 2002/0168995 A1 | 11/2002 | Terry et al. | |
| 2002/0168996 A1 | 11/2002 | Terry et al. | |
| 2002/0176438 A1* | 11/2002 | Karjalainen | 370/441 |
| 2004/0219943 A1 | 11/2004 | Terry et al. | |
| 2005/0254439 A1* | 11/2005 | Fleck et al. | 370/256 |
| 2006/0045110 A1* | 3/2006 | Miura et al. | 370/408 |
| 2006/0083183 A1* | 4/2006 | Teague et al. | 370/278 |
| 2006/0187944 A1* | 8/2006 | Takeo et al. | 370/408 |
| 2007/0002766 A1* | 1/2007 | Park et al. | 370/254 |
| 2008/0039098 A1* | 2/2008 | Papasakellariou et al. | 455/442 |
| 2009/0042615 A1* | 2/2009 | Teo et al. | 455/562.1 |
| 2009/0082059 A1 | 3/2009 | Terry et al. | |
| 2009/0238241 A1* | 9/2009 | Hooli et al. | 375/133 |
| 2009/0325585 A1* | 12/2009 | Farajidana et al. | 455/450 |
| 2010/0103902 A1* | 4/2010 | Kim et al. | 370/330 |
| 2010/0135273 A1* | 6/2010 | Kim | 370/344 |
| 2011/0086644 A1* | 4/2011 | Dahlman et al. | 455/450 |
| 2011/0176480 A1* | 7/2011 | Dahlman et al. | 370/328 |
| 2011/0310931 A1* | 12/2011 | Mehta et al. | 375/133 |

FOREIGN PATENT DOCUMENTS

| | | |
|---|---|---|
| CN | 101330325 A | 12/2008 |
| JP | 2008172375 A1 | 7/2008 |
| RU | 2157591 C2 | 10/2000 |
| WO | 2008084622 A1 | 7/2008 |

OTHER PUBLICATIONS

English Translation of the Written Opinion of the International Search Authority in international application No. PCT/CN20091072720, mailed on Sep. 24, 2009.

International Search Report dated Sep. 24, 2009 corresponding to International Patent Application No. PCT/CN2009/07270 and English translation thereto, 6 pages.

Nokia Siemens Networks et al: "On SRS frequency position definition", Published Apr. 21, 2011.

Huawei et al: "Remaining issues on SRS hopping", Published Jan. 13, 2011.

NTT Docomo et al: "Assignment Scheme for Sounding Reference Signals in E-UTRA uplink", Nov. 5-9, 2007.

Nokia Siemens Networks et al: "Frequency hopping arrangement for SRS", Published Sep. 24, 2009.

Supplementary European Search Report in European application No. 09802384.9, mailed Jan. 26, 2012.

Physical Channels and Modulation May 2008.

* cited by examiner

METHOD FOR TRANSMITTING AN UPLINK CHANNEL SOUNDING REFERENCE SIGNAL

RELATED APPLICATIONS

This is the U.S. national stage application which claims priority, under 35 U.S.C. §119, to International Patent Application No.: PCT/CN2009/072720, filed on Jul. 10, 2009, which claims priority to Chinese Patent Application No.: 200810144407.6, filed Jul. 29, 2008, the disclosures of which are incorporated by reference herein in its entirety.

TECHNICAL FIELD

The present invention relates to a technique for transmitting an uplink channel sounding reference signal, particularly to a method for transmitting an uplink channel sounding reference signal.

BACKGROUND

In the Long Term Evolution (LTE) system, an uplink channel sounding reference signal (SRS) is a signal sent to the base station by the user equipment (UE) side, i.e. the terminal and is mainly used by the base station to sound the quality of an uplink channel. According to the result of the sounding, the base station achieves the scheduling of the uplink data, e.g. the frequency resource occupied in uplink transmission, or the modulation coding mode used.

In existing LTE systems, multiple SRS bandwidths are supported. An SRS bandwidth configuration is based on a tree structure and every SRS bandwidth configuration corresponds to one tree structure, wherein, the SRS-Bandwidth of the highest level in the tree structure corresponds to the maximum bandwidth of the SRS bandwidth configuration. The total number of resource blocks (RBs) corresponding to the uplink bandwidth configuration is $N_{RB}^{UL}$. Tables 1-4 illustrate the SRS bandwidth configurations under different uplink bandwidth configurations. Table 1 corresponds to $6 \leq N_{RB}^{UL} \leq 40$, Table 2 corresponds to $40 < N_{RB}^{UL} \leq 60$, Table 3 corresponds to $60 < N_{RB}^{UL} \leq 80$, and Table 4 corresponds to $80 < N_{RB}^{UL} \leq 110$.

In these tables, $m_{SRS,b}$ represents the number of RBs contained in every node on the $b^{th}$ level of the tree structure in the frequency domain; when $b>0$, $N_b$ represents the number of branch nodes of a node on the $(b-1)^{th}$ level, which are located on the $b^{th}$ level of the tree structure; while b=0 corresponds to the highest level of the tree structure, where there must be $N_b=1$, and $m_{SRS,0}$ is the maximum SRS bandwidth under the configuration.

TABLE 1

| SRS-Bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

| SRS-Bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

| SRS-Bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

| SRS-Bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

The frequency domain starting position of the SRS is determined by high layer configured cell-specific SRS bandwidth configuration, UE-specific SRS bandwidth $B_{SRS}$ and frequency domain position parameter $n_{RRC}$, RRC refers to Radio Resource Control, wherein:

Cell-specific SRS bandwidth configuration parameter: the UE determines the tree structure of the SRS bandwidth, $m_{SRS,b}$ and $N_b$ on every branch corresponding to the tree structure according to the uplink bandwidth and this parameter. This parameter is broadcast in the cell.

UE-specific SRS bandwidth parameter $B_{SRS}$: it corresponds to one of the four values of b in the above-mentioned tables and is used for determining on which level of the tree structure the SRS is located.

UE-specific SRS frequency domain position parameter $n_{RRC}$.

According to the tree structure of the SRS bandwidth and the three parameters above mentioned, the SRS frequency domain starting position is determined using the following formula.

$$k_0 = k'_0 + \sum_{b=0}^{B_{SRS}} 2M_{sc,b}^{RS} n_b \quad (1)$$

Wherein:

$k_0$ represents the frequency domain starting position of the uplink channel SRS, namely the subcarrier index number.

$k'_0 = (\lfloor N_{NB}^{UL}/2 \rfloor - m_{SRS,0}/2) N_{SC}^{RB} + k_{TC}$, wherein $(\lfloor N_{RB}^{UL}/2 \rfloor - m_{SRS,0}/2) N_{SC}^{RB}$ ensures that the bandwidth allowed to send the SRS in the system is at the central position of the system bandwidth, $\lfloor * \rfloor$ represents rounding down. $N_{SC}^{RB}$ represents the number of subcarriers contained in an RB in the frequency domain. SC is the abbreviation for "subcarrier", namely the subcarrier.

$k_{TC} \in \{0,1\}$ is the offset of SRS "Transmission Comb". The SRS is sent in every other subcarrier in the frequency domain, so it is like a comb in the frequency domain.

$M_{sc,b}^{RS} = m_{SRS,b} N_{sc}^{RB}/2$ represents the length of the SRS sequence at the branch of the $b^{th}$ level in the tree structure.

$n_b$ represents the index of a branch node of a node on the $(b-1)^{th}$ level, which is located on the $b^{th}$ level, hence there is $n_b \in \{0, 1, 2, \ldots, N_b-1\}$.

$n_b$ is calculated according to the frequency domain position parameter $n_{RRC}$, and the specific correlation between $n_b$ and $n_{RRC}$ is related to the way the $n_{RRC}$ is determined.

Currently, there is no specific solutions as to how to determine $n_{RRC}$, and the frequency domain starting position obtained from the existing solutions is incorrect. Therefore, the SRS frequency domain starting position can not be determined correctly, which leads to the problem that the UE can not send an SRS to the base station at the correct frequency domain starting position, and thus it is difficult for the base station to perform the uplink channel sounding accurately.

SUMMARY

The technical problem to be solved in the present invention is to provide a method for transmitting an uplink channel sounding reference signal, which makes the base station to perform the uplink channel sounding accurately.

To solve the above-mentioned technical problem, the present invention provides a method for transmitting an uplink channel sounding reference signal, including:

a base station assigns resource to an uplink channel sounding reference signal (SRS) of a UE, and sends SRS configuration parameters to the UE, the SRS configuration parameters include an SRS bandwidth parameter $B_{SRS}$ and an SRS frequency domain position parameter $n_{RRC}$:

after receiving the SRS configuration parameters, the UE calculates the frequency domain starting position of the SRS of the resource used for sending the SRS according to the SRS configuration parameters, and then sends the SRS to the base station using the resource;

wherein, the frequency domain resource assigned to the SRS by the base station corresponds to a node in a tree structure of an SRS bandwidth configuration, and the configured $B_{SRS}$ corresponds to the level on which the node is located, while the configured $n_{RRC}$ corresponds to the index of the branch node on the lowest level of the node in the tree structure.

Further, the $n_{RRC}$ may be:

$$n_{RRC} = \left\{0, 1, \ldots, \left(\prod_{b=0}^{3} N_b\right) - 1\right\},$$

wherein $N_b$ may represent the number of branch nodes of a node on the $(b-1)^{th}$ level, which are located on the $b^{th}$ level of the tree structure, and when $b=0$, $N_b=1$.

Further, the calculation of the frequency domain starting position of the SRS of the resource used for sending the SRS according to the SRS configuration parameters may be specifically as follows: the index $n_b$ of a branch node of a node on the $(b-1)^{th}$ level, which is located on the $b^{th}$ level, may be calculated according to the following formula; the frequency domain starting position of the SRS may be calculated according to the $n_b$ calculated: $n_b = \lfloor 4n_{RRC}/m_{SRS,b} \rfloor \mod N_b$, wherein $\lfloor * \rfloor$ may represent rounding down, $m_{SRS,b}$ may represent the number of resource blocks contained in every node on the $b^{th}$ level of the tree structure in the frequency domain, and $b = 0, 1, \ldots, B_{SRS}$.

Preferably, the $n_{RRC}$ may correspond to the index of any branch node on the lowest level of the node in the tree structure, and the indexes of branch nodes on the lowest level of the tree structure may start from 0 and may be numbered 0, 1, 2, 3 ... in sequence.

Preferably, after the SRS is sent to the base station using the resource, the method may also include:

the base station may receive the SRS sent by the UE at the corresponding time-frequency position according to the SRS configuration parameters of the UE.

The present invention also provides a method for transmitting an uplink channel sounding reference signal, which includes:

a base station assigns resource to an uplink channel sounding reference signal (SRS) of a UE, and sends SRS configuration parameters to the UE, wherein the SRS configuration parameters including an SRS bandwidth parameter $B_{SRS}$ and an SRS frequency domain position parameter $n_{RRC}$;

after receiving the SRS configuration parameters, the UE calculates the frequency domain starting position of the SRS of the resource used for sending the SRS, and then sends the SRS to the base station using the resource;

wherein the frequency domain resource assigned to the SRS by the base station corresponds to a node in a tree structure of the SRS bandwidth configuration, and the configured $B_{SRS}$ corresponds to the level on which the node is located, and the configured $n_{RRC}$ corresponds to the index of the node on the level determined by the $B_{SRS}$ in the tree structure.

Further, the $n_{RRC}$ may be:

$$n_{RRC} = \left\{0, 1, \ldots, \left(\prod_{b=0}^{B_{SRS}} N_b\right) - 1\right\},$$

wherein $N_b$ may represent the number of branch nodes of a node on the $(b-1)^{th}$ level, which are located on the $b^{th}$ level of the tree structure, and when $b=0$, $N_b=1$.

Further, the calculation of the frequency domain starting position of the SRS of the resource used for sending the SRS according to the SRS configuration parameters may be specifically as follows: the index $n_b$ of a branch node of a node on the $(b-1)^{th}$ level, which is located on the $b^{th}$ level, may be calculated according to the following formula; the frequency domain starting position of the SRS may be calculated according to the $n_b$ calculated: $n_b = \lfloor m_{SRS,B_{SRS}} n_{RRC}/m_{SRS,b} \rfloor$ mod $N_b$, wherein $\lfloor * \rfloor$ may represent rounding down, $m_{SRS,b}$ may represent the number of resource blocks contained in every node on the $b^{th}$ level of the tree structure in the frequency domain, and $b=0, 1, \ldots, B_{SRS}$.

Preferably, the indexes of nodes on every level of the tree structure may start from 0, and may be numbered 0, 1, 2, 3 ... in sequence.

Further, after the SRS is sent to the base station using the resource, the method may also include: the base station may receive the SRS sent by the UE at the corresponding time-frequency position according to the SRS configuration parameters of the UE.

With the method of the present invention, the correlation between $n_{RRC}$ and $n_b$ can be determined correctly, and the method can solve the existing problem that the frequency domain starting position of the SRS can not be determined, which makes it difficult to perform the uplink channel sounding accurately.

DETAILED DESCRIPTION

In the following description, the embodiments of the present invention are described in detail in combination with the accompanying drawings, so that those skilled in the art can sufficiently understand the realization process that how the present invention solves the technical problem using the technical means and achieves the technical effect, and can implement the present invention according to the realization process.

The First Embodiment

Figure 1:
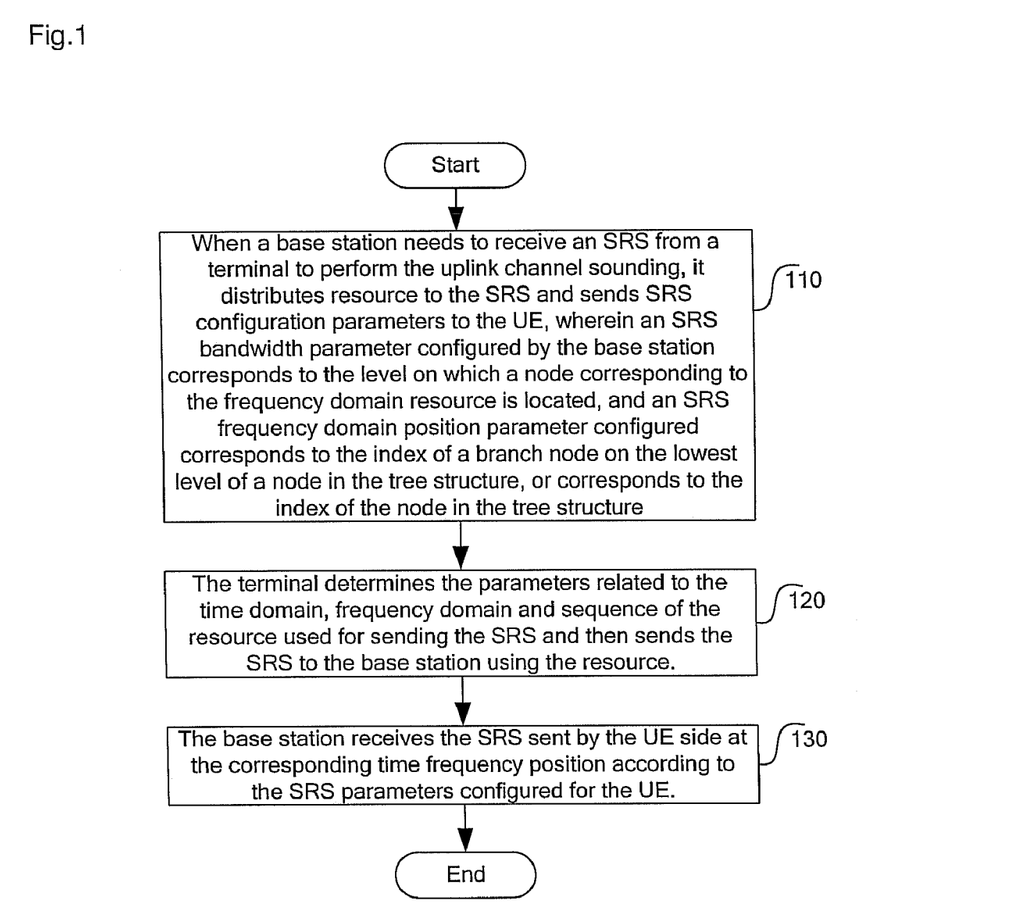
FIG. 1 is a flow chart of a method illustrating that a base station sends SRS configuration information and a UE sends an SRS according to the configuration information.

FIG. 1 illustrates a method for a base station sending SRS configuration information and a UE sending an SRS according to the configuration information. The method includes the following steps.

Step 110, when a base station needs to receive an SRS from a UE to perform the uplink channel sounding, it assigns resource to the SRS and sends SRS configuration parameters to the UE.

SRS configuration parameters are classified into three categories, wherein the first category is a parameter related to the time domain position of an SRS; the second category is a parameter related to the sequence used by an SRS; and the third category is a parameter related to the frequency domain position of an SRS. The first and second categories of parameters are outside the scope of the present invention. Some cell-specific parameters are broadcast in cells, while UE-specific parameters are configured through high layer signaling.

Parameters related to the frequency domain position of an SRS include an SRS bandwidth parameter $B_{SRS}$ and an SRS frequency domain position parameter $n_{RRC}$. The frequency domain resource assigned to the SRS by the base station corresponds to a node in a tree structure of SRS bandwidth configuration; the SRS bandwidth parameter $B_{SRS}$ configured by the base station corresponds to the level on which the node is located; the configured SRS frequency domain position parameter $n_{RRC}$, corresponds to the index of the branch node on the lowest level of the node in the tree structure, or corresponds to the index of the node on the level determined by the $B_{SRS}$ in the tree structure.

Step 120, according to the SRS configuration parameters received, the UE determines the parameters related to the time domain, frequency domain and sequence of the resource used for sending the SRS, and then sends the SRS to the base station using the resource;

the UE determines the transmission period of the SRS and the number of the subframe in which the SRS is located according to the received parameters related to the time domain position, determines the frequency domain position (including the frequency domain starting position) where the SRS is sent and the length of sequence according to the received parameters related to the frequency domain position, and determines the sequence used by the SRS according to the parameter related to the sequence.

Step 130, the base station receives the SRS sent by the UE side at the corresponding time frequency position according to the SRS parameters configured for the UE.

In the embodiment, a base station assigns the resource to the SRS and the resource assigned corresponds to a node in the tree structure in the frequency domain; the SRS bandwidth parameter $B_{SRS}$ is configured according to the level on which the node is located and the SRS frequency domain position parameter $n_{RRC}$, is configured according to the index of a the branch node on the lowest level of the node in the tree structure, wherein the $n_{RRC}$ is:

$$n_{RRC} = \left\{0, 1, \ldots, \left(\prod_{b=0}^{3} N_b\right) - 1\right\}.$$

In the embodiment, the value of $n_{RRC}$ for a branch node which is not on the lowest level is the index of any branch node on the lowest level of the branch node.

The UE calculates $n_b$ according to the above-mentioned $n_{RRC}$ wherein $n_b$ represents the index of a branch node of a node on the $(b-1)^{th}$ level, which are located on the $b^{th}$ level:

$n_b = \lfloor 4n_{RRC}/m_{SRS,b} \rfloor$ mod $N_b$.

According to the parameter $n_b$ calculated, the UE can calculate a correct frequency domain starting position by the formula (1) and sends the SRS on the corresponding resource, so that the base station can receive the SRS correctly. Other parameters required in the calculation according to the formula (1) may be acquired through existing means, which are not repeated here.

Table 5, shown below, illustrates an SRS bandwidth configuration for the configuration 0 in Table 2. From Table 2, the following values which are $N_0=1, N_1=2, N_2=2$ and $N_3=3$ can be obtained, wherein the UE-specific SRS bandwidth parameter $B_{SRS}$ is configured by the base station, therefore, in this diagram:

when $B_{SRS}=0$, there is only one node on the level, and $n_{RRC}=\{0, 1, 2, \ldots, 11\}$;

when $B_{SRS}=1$, there are two nodes on the level: for the node #0, $n=\{0, 1, \ldots, 5\}$, and for the node #1, $n_{RRC}=\{6, 7, \ldots, 11\}$;

when $B_{SRS}=2$, there are four nodes on the level: for the node #0, $n_{RRC}=\{0,1,2\}$; for the node #1, $n_{RRC}=\{3,4,5\}$; for the node #2, $n_{RRC}=\{6,7,8\}$; and for the node #3, $n_{RRC}=\{9,10,11\}$;

when $B_{SRS}=3$, the configuration corresponds to the lowest level of the tree structure, the values of all the nodes are $\{0, 1, 2, \ldots, 11\}$ respectively.

Here, the number of nodes on the level of the tree structure where the SRS is located is determined according to the tree structure. When configuring the SRS parameters for the UE, the base station configures the time-frequency-code parameters used to send the SRS by the UE according to the actual condition, e.g. coverage requirements, collisions with other UEs, the moving speed of UE, etc.

The Second Embodiment

The process of the second embodiment is the same as that of the first embodiment. In the following description, only the method for determining the frequency domain starting position is described.

In the embodiment, a base station assigns the resource to the SRS and the resource assigned corresponds to a node in the tree structure in the frequency domain; the SRS bandwidth parameter $B_{SRS}$ is configured according to the level on which the node is located and the SRS frequency domain position parameter $n_{RRC}$ is configured according to the index of the node on the level determined by $B_{SRS}$ (the indexes of nodes on every level start from 0 and are numbered 0, 1, 2, 3 ... in sequence), hence the scope of the value of $n_{RRC}$ is $$n_{RRC} = \left\{0, 1, \ldots , \left(\prod_{b=0}^{B_{SRS}} N_b\right) - 1\right\}.$$

The UE calculates $n_b$ according to the formula (I) and the meaning of $n_b$ in the formula (I), wherein $n_b$ represents the index of a branch node of a node on the $(b-1)^{th}$ level, which is located on the $b^{th}$ level:

$$n_b = \lfloor m_{SRS,B_{SRS}} n_{RRC}/m_{SRS,b} \rfloor \bmod N_b.$$

According to the parameter $n_b$ calculated, the UE can calculate a correct frequency domain starting position by the formula (1) and sends the SRS on the corresponding resource, so that the base station can receive the SRS correctly.

Table 6, shown below, illustrates an SRS bandwidth configuration for the configuration 0 in Table 2. From the configuration 0 in Table 2, the following values which are $N_0=1$, $N_1=2, N_2=2$ and $N_3=3$ can be obtained, so in the diagram:

$$\text{when } B_{SRS} = 0, n_{RRC} = \left\{0, 1, \ldots , \left(\prod_{b=1}^{B_{SRS}} N_b\right) - 1\right\} = \{0\};$$

when $B_{SRS} = 1$, $$n_{RRC} = \left\{0, 1, \ldots , \left(\prod_{b=1}^{B_{SRS}} N_b\right) - 1\right\} = \{0, 1, \ldots , N_1 - 1\} = \{0, 1\};$$

when $B_{SRS} = 2$, $$n_{RRC} = \left\{0, 1, \ldots , \left(\prod_{b=1}^{B_{SRS}} N_b\right) - 1\right\} = \{0, 1, \ldots , N_1 N_2 - 1\} = \{0, 1, 2, 3\};$$

and when $B_{SRS} = 3$, $n_{RRC} = \left\{0, 1, \ldots , \left(\prod_{b=1}^{B_{SRS}} N_b\right) - 1\right\} =$ $$\{0, 1, \ldots , N_1 N_2 N_3 - 1\} = \{0, 1, 2, \ldots , 11\}.$$

In the following description, applied cases in which the frequency domain starting position of an uplink channel SRS is determined according to the SRS bandwidth configuration parameter, the SRS bandwidth $B_{SRS}$ and the frequency domain position parameter $n_{RRC}$ are presented in combination with FIG. 2.

Case 1

Figure 2:
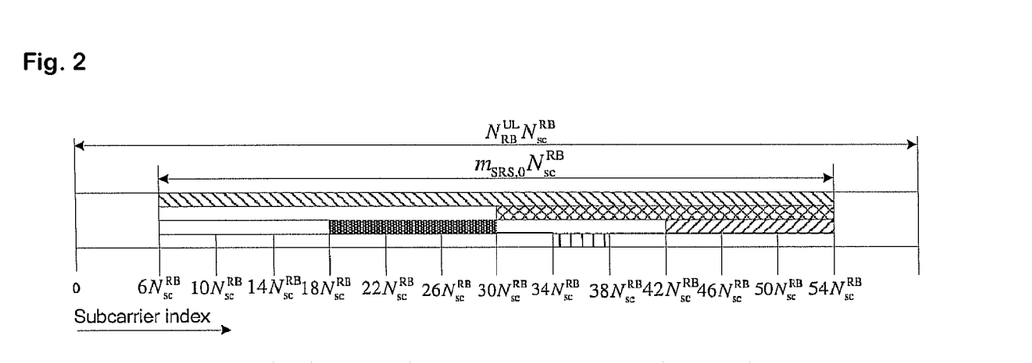
FIG. 2 is a diagram illustrating the calculation of the frequency domain starting position of the SRS for the configuration 0 in Table 2.

As shown in FIG. 2, for the configuration 0 in Table 2, if the base station adopts the method of the first embodiment, the UE-specific parameters configured are $B_{SRS}=1$ and $n_{RRC}=6$, and the corresponding frequency domain resource is the area represented by 
of the level corresponding to $B_{SRS}=1$ as shown in FIG. 2, wherein $n_{RRC}$ can be any one of $\{6,7,8,9,10,11\}$.

After the UE receives the above-mentioned parameters, the following can be obtained according to the configuration 0 in Table 2:

$N_0=1, N_1=2, N_2=2, N_3=3$ $m_{SRS,0}=48, m_{SRS,1}=24, m_{SRS,2}=12, m_{SRS,3}=4$ $m_{SRS,B_{SRS}}=m_{SRS,1}=24$.

According to $n_b=\lfloor 4n_{RRC}/m_{SRS,b}\rfloor \bmod N_b$ and $b=0, 1, \ldots, B_{SRS}$, the following can be obtained by calculation:

$n_0=\lfloor 4n_{RRC}/m_{SRS,0}\rfloor \bmod N_0=\lfloor 24/48\rfloor \bmod 1=0$ $n_1=\lfloor 4n_{RRC}/m_{SRS,1}\rfloor \bmod N_1=\lfloor 24/24\rfloor \bmod 2=1$ If the base station adopts the method of the second embodiment, the configured parameters are $B_{SRS}=1$ and $n_{RRC}=1$, so according to $n_b=\lfloor m_{SRS,B_{SRS}} n_{RRC}/m_{SRS,b}\rfloor \bmod N_b$, the following can be obtained by calculation:

$n_0=\lfloor 24n_{RRC}/m_{SRS,0}\rfloor \bmod N_0=\lfloor 24/48\rfloor \bmod 1=0$ $n_1=\lfloor 24n_{RRC}/m_{SRS,1}\rfloor \bmod N_1=\lfloor 24/24\rfloor \bmod 2=1$.

For the same branch nodes, there are different scopes of values of $n_{RRC}$ in different embodiments, but the values of $n_b$ obtained from the corresponding correlation between $n_{RRC}$ and $n_b$ are the same, and so the frequency domain starting positions of the SRSs are also the same.

Assume $N_{RB}^{UL}=60$ and $N_{SC}^{RB}=12$, then $k'_0=(\lfloor N_{NB}^{UL}/2\rfloor - m_{SRS,0}/2)N_{SC}^{RB} k_{TC}=6N_{SC}^{RB}$.

According to $$k_0 = k'_0 + \sum_{b=0}^{B_{SRS}} 2M_{sc,b}^{RS} n_b,$$

the UE gets the frequency domain starting position of the SRS, namely the index of the frequency domain subcarrier by calculation:

$$k_0 = k'_0 + \sum_{b=0}^{B_{SRS}} 2M_{sc,b}^{RS} n_b$$

$$= k'_0 + \sum_{b=0}^{B_{SRS}} m_{SRS,b} N_{sc}^{RB} n_b$$

$$= k'_0 + N_{sc}^{RB} (m_{SRS,0} n_0 + m_{SRS,1} n_1)$$

$$= 6N_{SC}^{RB} + N_{SC}^{RB}(0 + 0 + 24)$$

$$= 30N_{SC}^{RB}$$

$$= 360.$$

From the diagram illustrating the calculation of the frequency domain starting position of the SRS as shown in FIG. 2, it can be got that the frequency domain starting position of the SRS corresponding to the area  is $30N_{SC}^{RB}$, namely, the frequency domain starting position calculated by the UE is consistent with the frequency domain starting position of the frequency domain resource assigned by the base station. Therefore, the base station can receive the SRS sent by the UE correctly and then perform the uplink channel sounding accurately.

Case 2

As shown in FIG. 2, for the configuration 0 in Table 2, if the base station adopts the method of the first embodiment, the UE-specific parameters configured are $B_{SRS}=2$ and $n_{RRC}=3$, namely corresponding to the area  of the level corresponding to $B_{SRS}=2$ as shown in FIG. 2.

After the UE receives the relevant parameters, the following can be obtained according to the configuration 0 in Table 2:

$N_0=1$, $N_1=2$, $N_2=2$, $N_3=3$
$m_{SRS,0}=48$, $m_{SRS,1}=24$, $m_{SRS,2}=12$, $m_{SRS,3}=4$
$m_{SRS,B_{SRS}}=m_{SRS,2}=12$.

According to $n_b=\lfloor 4n_{RRC}/m_{SRS,b}\rfloor \bmod N_b$ and $b=0, 1, \ldots, B_{SRS}$, the following can be obtained by calculation:

$$n_0=\lfloor 4n_{RRC}/m_{SRS,0}\rfloor \bmod N_0=\lfloor 12/48\rfloor \bmod 1=0$$

$$n_1=\lfloor 4n_{RRC}/m_{SRS,1}\rfloor \bmod N_1=\lfloor 12/24\rfloor \bmod 2=0$$

$$n_2=\lfloor 4n_{RRC}/m_{SRS,2}\rfloor \bmod N_2=\lfloor 12/12\rfloor \bmod 2=1.$$

If the base station adopts the method of the second embodiment, the configured parameters are $B_{SRS}=2$ and $n_{RRC}=1$; here, according to:

$n_b=\lfloor m_{SRS,B_{SRS}}n_{RRC}/m_{SRS,b}\rfloor \bmod N_b$, the UE gets the following by calculation:

$$n_0=\lfloor 12n_{RRC}/m_{SRS,0}\rfloor \bmod N_0=\lfloor 12/48\rfloor \bmod 1=0$$

$$n_1=\lfloor 12n_{RRC}/m_{SRS,1}\rfloor \bmod N_1=\lfloor 12/24\rfloor \bmod 2=1$$

$$n_2=\lfloor 12n_{RRC}/m_{SRS,2}\rfloor \bmod N_2=\lfloor 12/12\rfloor \bmod 2=1.$$

From the above, the results obtained from the two methods are the same by calculation.

Assume $N_{RB}^{UL}=60$ and $N_{SC}^{RB}=12$, then $k'_0=(\lfloor N_{RB}^{UL}/2\rfloor - m_{SRS,0}/2)N_{SC}^{RB}+k_{TC}=6N_{SC}^{RB}$.

According to $$k_0 = k'_0 + \sum_{b=0}^{B_{SRS}} 2M_{sc,b}^{RS}n_b,$$

the UE gets the frequency domain starting position of the SRS by calculation, i.e., the index of the frequency domain subcarrier is:

$$k_0 = k'_0 + \sum_{b=0}^{B_{SRS}} 2M_{sc,b}^{RS}n_b$$

$$= k'_0 + \sum_{b=0}^{B_{SRS}} m_{SRS,b}N_{sc}^{RB}n_b$$

$$= k'_0 + N_{sc}^{RB}(m_{SRS,0}n_0 + m_{SRS,1}n_1 + m_{SRS,2}n_2)$$

$$= 6N_{SC}^{RB} + N_{SC}^{RB}(0+0+12)$$

$$= 18N_{SC}^{RB}$$

$$= 216$$

From the diagram illustrating the calculation of the frequency domain starting position of the SRS as shown in FIG. 2, it also can be got that, the frequency domain starting position of the SRS corresponding to the area is $18N_{SC}^{RB}$, i.e. the frequency domain starting position calculated by the UE is consistent with the frequency domain starting position of the frequency domain resource assigned by the base station. Therefore, the base station can receive the SRS sent by the UE correctly and then performs the uplink channel sounding accurately.

Case 3

As shown in FIG. 2, for the configuration 0 in Table 2, if the base station adopts the method of the first embodiment, the UE-specific parameters configured are $B_{SRS}=2$ and $n_{RRC}=9$, namely corresponding to the area of the level corresponding to $B_{SRS}=2$ as shown in FIG. 2.

After the UE receives the relevant parameters, the following can be obtained according to the configuration 0 in Table 2:

$N_0=1$, $N_1=2$, $N_2=2$, $N_3=3$
$m_{SRS,0}=48$, $m_{SRS,1}=24$, $m_{SRS,2}=12$, $m_{SRS,3}=4$
$m_{SRS,B_{SRS}}=m_{SRS,2}=12$.

According to $n_b=\lfloor 4n_{RRC}/m_{SRS,b}\rfloor \bmod N_b$ and $b=0, 1, \ldots, B_{SRS}$, the following can be obtained by calculation:

$$n_0=\lfloor 4n_{RRC}/m_{SRS,0}\rfloor \bmod N_0=\lfloor 36/48\rfloor \bmod 1=0$$

$$n_1=\lfloor 4n_{RRC}/m_{SRS,1}\rfloor \bmod N_1=\lfloor 36/24\rfloor \bmod 2=1$$

$$n_2=\lfloor 4n_{RRC}/m_{SRS,2}\rfloor \bmod N_2=\lfloor 36/12\rfloor \bmod 2=1.$$

If the base station adopts the method of the second embodiment, the configured parameters are $B_{SRS}=2$ and $n_{RRC}=3$. According to, $n_b=\lfloor m_{SRS,B_{SRS}}n_{RRC}/m_{SRS,b}\rfloor \bmod N_b$, the following can be obtained by calculation:

$$n_0=\lfloor 12n_{RRC}/m_{SRS,0}\rfloor \bmod N_0=\lfloor 36/48\rfloor \bmod 1=0$$

$$n_1=\lfloor 12n_{RRC}/m_{SRS,1}\rfloor \bmod N_1=\lfloor 36/24\rfloor \bmod 2=1$$

$$n_2=\lfloor 12n_{RRC}/m_{SRS,2}\rfloor \bmod N_2=\lfloor 36/12\rfloor \bmod 2=1.$$

Assume $N_{RB}^{UL}=60$ and $N_{SC}^{RB}=12$, then $k'_0=(\lfloor N_{RB}^{UL}/2\rfloor - m_{SRS,0}/2)N_{SC}^{RB}+k_{TC}=6N_{SC}^{RB}$.

According to $$k_0 = k'_0 + \sum_{b=0}^{B_{SRS}} 2M_{sc,b}^{RS}n_b,$$

the UE gets the frequency domain starting position of the SRS by calculation, i.e. the index of the frequency domain subcarrier is:

$$k_0 = k'_0 + \sum_{b=0}^{B_{SRS}} 2M_{sc,b}^{RS}n_b$$

$$= k'_0 + \sum_{b=0}^{B_{SRS}} m_{SRS,b}N_{sc}^{RB}n_b$$

$$= k'_0 + N_{sc}^{RB}(m_{SRS,0}n_0 + m_{SRS,1}n_1 + m_{SRS,2}n_2)$$

-continued $$= 6N_{SC}^{RB} + N_{SC}^{RB}(0 + 24 + 12)$$

$$= 42N_{SC}^{RB}$$

$$= 504$$

From the diagram illustrating the calculation of the frequency domain starting position of the SRS as shown in FIG. 2, it can also be got that, the frequency domain starting position of the SRS corresponding to the area ▨▨▨▨ is $42N_{SC}^{RB}$, namely the frequency domain starting position calculated by the UE is consistent with the frequency domain starting position of the frequency domain resource assigned by the base station. Therefore, the base station can receive the SRS sent by the UE correctly and then perform the uplink channel sounding accurately.

Case 4

As shown in FIG. 2, for the configuration 0 in Table 2, if the base station adopts the method of the first embodiment, the UE-specific parameters configured are $B_{SRS}=3$ and $n_{RRC}=7$, namely corresponding to the area

▯▯▯▯▯ of the level corresponding to $B_{SRS}=3$ as shown in FIG. 2.

After the UE receives the relevant parameters, the following can be obtained according to the configuration 0 in Table 2:

$N_0=1$, $N_1=2$, $N_2=2$, $N_3=3$
$m_{SRS,0}=48$, $m_{SRS,1}=24$, $m_{SRS,2}=12$, $m_{SRS,3}=4$
$m_{SRS,0}=48$, $m_{SRS,1}=24$, $m_{SRS,2}=12$, $m_{SRS,3}=4$.
$m_{SRS,B_{SRS}}=m_{SRS,3}=4$.

According to $n_b = \lfloor 4n_{RRC}/m_{SRS,b} \rfloor \mod N_b$ and $b=0, 1, \ldots, B_{SRS}$, the UE gets the following by calculation:

$n_0 = \lfloor 4n_{RRC}/m_{SRS,0} \rfloor \mod N_0 = \lfloor 28/48 \rfloor \mod 1 = 0$ $n_1 = \lfloor 4n_{RRC}/m_{SRS,1} \rfloor \mod N_1 = \lfloor 28/24 \rfloor \mod 2 = 1$ $n_2 = \lfloor 4n_{RRC}/m_{SRS,2} \rfloor \mod N_2 = \lfloor 28/12 \rfloor \mod 2 = 0$ $n_3 = \lfloor 4n_{RRC}/m_{SRS,3} \rfloor \mod N_3 = \lfloor 28/4 \rfloor \mod 3 = 1$.

If the base station adopts the method of the second embodiment, the configured parameters are $B_{SRS}=3$ and $n_{RRC}=7$, so according to $n_b = \lfloor m_{SRS,B_{SRS}} n_{RRC}/m_{SRS,b} \rfloor \mod N_b$, the following can be obtained by calculation:

$n_0 = \lfloor 4n_{RRC}/m_{SRS,0} \rfloor \mod N_0 = \lfloor 28/48 \rfloor \mod 1 = 0$ $n_1 = \lfloor 4n_{RRC}/m_{SRS,1} \rfloor \mod N_1 = \lfloor 28/24 \rfloor \mod 2 = 1$ $n_2 = \lfloor 4n_{RRC}/m_{SRS,2} \rfloor \mod N_2 = \lfloor 28/12 \rfloor \mod 2 = 0$ $n_3 = \lfloor 4n_{RRC}/m_{SRS,3} \rfloor \mod N_3 = \lfloor 28/4 \rfloor \mod 3 = 1$.

It can be seen that, when the node assigned in the frequency domain is on the lowest level of the tree structure, the value of $n_{RRC}$ obtained from the method of the first embodiment is the same as that from the method of the second embodiment.

Assume $N_{RB}^{UL}=60$ and $N_{SC}^{RB}=12$, then $k'_0 = (\lfloor N_{RB}^{UL}/2 \rfloor - m_{SRS,0}/2)N_{SC}^{RB} + k_{TC} = 6N_{SC}^{RB}$.

According to $$k_0 = k'_0 + \sum_{b=0}^{B_{SRS}} 2M_{sc,b}^{RS} n_b,$$

the base station gets the frequency domain starting position of the SRS by calculation, namely the index of the frequency domain subcarrier is $$k_0 = k'_0 + \sum_{b=0}^{B_{SRS}} 2M_{sc,b}^{RS} n_b$$

$$= k'_0 + \sum_{b=0}^{B_{SRS}} m_{SRS,b} N_{sc}^{RB} n_b$$

$$= k'_0 + N_{sc}^{RB}(m_{SRS,0}n_0 + m_{SRS,1}n_1 + m_{SRS,2}n_2 + m_{SRS,2}n_2)$$

$$= 6N_{SC}^{RB} + N_{SC}^{RB}(0 + 24 + 0 + 4)$$

$$= 34N_{SC}^{RB}$$

$$= 408.$$

From the diagram illustrating the calculation of the frequency domain starting position of the SRS as shown in FIG. 2, it also can be got that, the frequency domain starting position of the SRS corresponding to the area ▯▯▯▯ is $34N_{SC}^{RB}$, i.e. the frequency domain starting position calculated by the UE is consistent with the frequency domain starting position of the frequency domain resource assigned by the base station. Therefore, the base station can correctly receive the SRS sent by the UE and then perform the uplink channel sounding accurately.

The above-mentioned descriptions are only embodiments of the present invention and are not intended to limit the present invention. For those skilled in the art, the present invention may have various changes and modifications. All modifications, equivalent substitutions and improvements etc, made within the spirit and principle of the present invention, shall be included in the appended claims of the present invention. For example, the system to which the present invention is applied is not limited to the LTE system.

INDUSTRIAL APPLICABILITY

The present invention can determine the correlation between $n_{RRC}$ and $n_b$ correctly and solve the existing problem that the frequency domain starting position of the SRS can not be determined, which makes it difficult to perform the uplink channel sounding accurately, thus has excellent industrial applicability.

What is claimed is:

1. A method for transmitting an uplink channel sounding reference signal (SRS), including:
   receiving, by a User Equipment (UE), SRS configuration parameters from a base station, wherein the SRS configuration parameters include an SRS bandwidth parameter $B_{SRS}$ and an SRS frequency domain position parameter $n_{RRC}$, wherein RRC refers to Radio Resource Control;
   calculating, by the UE, the frequency domain starting position of the SRS of the resource used for sending the SRS according to the SRS configuration parameters after receiving the SRS configuration parameters, and then sending the SRS to the base station using the resource;
   wherein the frequency domain resource assigned to the SRS by the base station corresponds to a node in a tree structure of an SRS bandwidth configuration, and the configured $B_{SRS}$ corresponds to the level on which the node is located, while the configured $n_{RRC}$ corresponds to the index of the branch node on the lowest level of the node in the tree structure;

wherein the calculation of the frequency domain starting position of the SRS of the resource used for sending the SRS according to the SRS configuration parameters is specifically as follows: calculating index $n_b$ according to the following formula, wherein the index $n_b$ is the index of a branch node located on the $b^{th}$ level of a node on the $(b-1)^{th}$ level; and then the frequency domain starting position of the SRS is calculated according to the $n_b$:

$n_b = \lfloor 4n_{RRC}/m_{SRS,b} \rfloor \mod N_b$;

wherein $\lfloor * \rfloor$ represents rounding down, $m_{SRS,b}$ represents the number of resource blocks contained in every node on the $b^{th}$ level of the tree structure in the frequency domain, and $b = 0, 1, \ldots, B_{SRS}$; and wherein $N_b$ is the number of branch nodes located on the $b^{th}$ level of a node on the $(b-1)^{th}$ level of the tree structure, and when $b=0$, then $N_b=1$.

2. The method according to claim 1, wherein the $n_{RRC}$ is:

$$n_{RRC} = \left\{0, 1, \ldots, \left(\prod_{b=0}^{3} N_b\right) - 1\right\}.$$

3. The method according to claim 2, wherein after the SRS is sent to the base station using the resource, the method also including:
receiving, by the base station, the SRS sent from the UE at the corresponding time-frequency position according to the SRS configuration parameters of the UE.

4. The method according to claim 1, wherein
the $n_{RRC}$ corresponds to the index of any branch node on the lowest level of the node in the tree structure, and the indexes of branch nodes on the lowest level of the tree structure start from 0 and are numbered 0, 1, 2, 3 . . . in sequence.

5. The method according to claim 4, wherein after the SRS is sent to the base station using the resource, the method also including:
receiving, by the base station, the SRS sent from the UE at the corresponding time-frequency position according to the SRS configuration parameters of the UE.

6. The method according to claim 1, wherein after the SRS is sent to the base station using the resource, the method also including:
receiving, by the base station, the SRS sent from the UE at the corresponding time-frequency position according to the SRS configuration parameters of the UE.

7. A method for transmitting an uplink channel sounding reference signal (SRS), including:
receiving, by a User Equipment (UE), SRS configuration parameters from a base station, wherein the SRS configuration parameters include an SRS bandwidth parameter $B_{SRS}$ and an SRS frequency domain position parameter $n_{RRC}$, wherein RRC refers to Radio Resource Control;
calculating, by the UE, the frequency domain starting position of the SRS of the resource used for sending the SRS after receiving the SRS configuration parameters, and then sending the SRS to the base station using the resource;
wherein the frequency domain resource assigned to the SRS by the base station corresponds to a node of a tree structure of an SRS bandwidth configuration, and the configured $B_{SRS}$ corresponds to the level on which the node is located, and the configured $n_{RRC}$ corresponds to the index of the node on the level determined by the $B_{SRS}$ in the tree structure; and
wherein the calculation of the frequency domain starting position of the SRS of the resource used for sending the SRS according to the SRS configuration parameters is specifically as follows: calculating index $n_b$ according to the following formula, wherein the index $n_b$ is the index of a branch node located on the $b^{th}$ level of a node on the $(b-1)^{th}$ level; and then the frequency domain starting position of the SRS is calculated according to the $n_b$ calculated:

$n_b = \lfloor m_{SRS,B_{SRS}} n_{RRC}/m_{SRS,b} \rfloor \mod N_b$, wherein $\lfloor * \rfloor$ represents rounding down, $m_{SRS,b}$ represents the number of resource blocks contained in every node on the $b^{th}$ level of the tree structure in the frequency domain, and $b = 0, 1, \ldots, B_{SRS}$; and wherein $N_b$ represents the number of branch nodes of a node on the $(b-1)^{th}$ level, which are located on the $b^{th}$ level of the tree structure, and when $b=0$, $N_b=1$.

8. The method according to claim 7, wherein the $n_{RRC}$ is:

$$n_{RRC} = \left\{0, 1, \ldots, \left(\prod_{b=0}^{B_{SRS}} N_b\right) - 1\right\}.$$

9. The method according to claim 8, wherein after the SRS is sent to the base station using the resource, the method also including:
receiving, by the base station, the SRS sent from the UE at the corresponding time-frequency position according to the SRS configuration parameters of the UE.

10. The method according to claim 7, wherein
the indexes of nodes on every level of the tree structure start from 0, and are numbered 0, 1, 2, 3 . . . in sequence.

11. The method according to claim 10, wherein after the SRS is sent to the base station using the resource, the method also including:
receiving, by the base station, the SRS sent from the UE at the corresponding time-frequency position according to the SRS configuration parameters of the UE.

12. The method according to claim 7, wherein after the SRS is sent to the base station using the resource, the method also including:
receiving, by the base station, the SRS sent from the UE at the corresponding time-frequency position according to the SRS configuration parameters of the UE.

* * * * *